United States Patent

[11] 3,622,524

[72] Inventors Mark Markovitz;
 Leo S. Kohn, both of Schenectady, N.Y.
[21] Appl. No. 757,168
[22] Filed Sept. 3, 1968
[45] Patented Nov. 23, 1971
[73] Assignee General Electric Company

[54] COMPOSITIONS OF EPOXY RESINS CURED WITH ORGANOTIN COMPOUNDS
5 Claims, No Drawings

[52] U.S. Cl. ............................................. 260/2 EC,
 117/161 ZB, 161/184 R, 260/18 EP, 260/47 EC,
 260/59 R, 260/429.7 R, 260/830 R
[51] Int. Cl. ........................................... C08g 30/10

[50] Field of Search .............................................. 260/2 EP, 2
 CN, 18 EP, 47 EP, 59, 830 TN, 429.7; 252/182

[56] References Cited
UNITED STATES PATENTS

| | | | |
|---|---|---|---|
| 2,803,609 | 8/1957 | Schlenker ..................... | 260/47 |
| 3,147,285 | 9/1964 | Mack ........................... | 260/2 EP |
| 3,244,670 | 4/1966 | Puchala et al. ................ | 260/47 EPC |

Primary Examiner—William H. Short
Assistant Examiner—T. Pertilla
Attorneys—William C. Crutcher, Joseph B. Forman, Frank L. Neuhauser, Oscar B. Waddell and Harold J. Halt ABSTRACT: Epoxy resins cured with organotin compounds provide electrical insulation which is characterized by good dissipation factor, high-heat distortion temperature and good corona resistance.

COMPOSITIONS OF EPOXY RESINS CURED WITH ORGANOTIN COMPOUNDS

This invention relates to epoxy resin compositions and to curing agents therefor. More particularly, it relates to new and useful epoxy resin compositions which are characterized by improved high voltage, electrical insulating qualities.

With the development of electrodynamic machinery which operates at higher and higher voltages, there has developed a corresponding need for electrical insulating materials which will keep pace with more rigorous requirements such as ability to operate at higher operating temperatures and at corona producing voltages, all with electrical losses which are kept at a minimum. Generally speaking, it is relatively easy to find electrical insulating materials such as resinous materials and the like which will have one or several of the desirable electrical insulating qualities which are sought for high-voltage operation of electrical machinery. However, it is seldom that one finds within a single electrical insulating material a community of properties which suits it alone for such rigorous operation. For example, silicone resins in general are characterized by very good corona resistance. However, at elevated temperatures over a period of time, such silicones often form rubbery materials which have a relatively low heat distortion temperature which results in low tensile, flexural and compressive strengths and ultimate failure under the mechanical stresses to which they are subjected in modern rotating equipment.

From the above it will be evident that there is a definite need for electrical insulation which will combine in one material adequate resistance to the various electrical and mechanical stresses which are experienced in high-voltage electrodynamic machines and it is a primary object of this invention to provide such materials.

It has been unexpectedly found that epoxy resins cured with certain organotin compositions are very well suited for electrical insulating purposes either as such or in tapes and the like which are not only corona-resistant under high-voltage stress but which also have a very high heat-distortion temperature with its accompanying good physical qualities such as tensile strength, flexural strength and the like and which at the same time have a very low dissipation or loss factor at elevated temperatures and voltages and resistance to corona damage.

Those features of the invention which are believed to be novel are set forth with particularity in the claims appended hereto. The invention will, however, be better understood and further advantages and objects thereof appreciated from a consideration of the following description.

Generally speaking, the organotin compounds of the present invention are used with epoxy resins in amounts of from about 20 to 120 parts by weight, and preferably 80 parts by weight per 100 parts of epoxy resin. Additional acidic or anhydride material can also be used.

Any of a number of organotin, specifically organostannoic, materials such as the oxide or materials which produce the oxide can be used in connection with the present invention. Generally speaking, dialkyltin and diaryltin oxides and combinations are preferred, including typically, dimethyltin oxide, butyl propyltin oxide, dihexyltin oxide, diphenyltin oxide, di(4-methylphenyl)tin oxide, phenylbutyltin oxide, and the like. Other organotin materials such as esters typified by the acetate, propionate and laurate, among others, and halides such as the chloride, bromide and iodide, which provide for ready entry of the tin into the organic composition can be used.

The tin-containing moiety is reacted with organic acidic or anhydride material to form the epoxy resin hardener or cross-linking material. Among such acidic materials which are useful are sebacic, succinic, glutaric, adipic, pimelic, suberic, azelaic, dimerized unsaturated fatty acids such as Emery Chemical's Empol 1010 Dimer Acid, isophthalic and terephthalic acids. Organo-functional carboxylic acids such as amino-functional materials as $\epsilon$-amino caproic acid, p-amino benzoic acid, m-amino benzoic acid, glutamic acid, and methionine may be used. Hydroxy-functional carboxylic acids can also be used, such as p-hydroxybenzoic acid, m-hydroxybenzoic acid, 7-hydroxyheptanoic acid, and 4-hydroxy-4'-carboxybiphenyl acid. Among the anhydrides which can be used are the maleic anhydride adduct of methylcyclopentadiene known as Nadic Methyl Anhydride made by Allied Chemical Company, hexahydrophthalic anhydride, phthalic anhydride, tetrahydrophthalic anhydride, methylsuccinic anhydride. dodecenylsuccinic anhydride, Alkendic anhydride, polymeric anhydrides such as polyazelaic polyanhydride, chlorendic anhydride, tetrabromophthalic anhydride, and the like. From a consideration of the above, other suitable materials will occur to those skilled in the art.

Generally speaking, the organotin material is reacted with the acidic material in equivalent proportions although excesses up to 50 percent of either material can be used. The following examples illustrate the preparation of the present organotin cross-linking or curing materials.

EXAMPLE A

A mixture of 303 g. (1.5 moles) sebacic acid and 373.5 g. (1.5 moles) dibutyltin oxide in 1,050 g. of benzene was stirred and refluxed in a flask attached to a Dean-Stark receiver. After 4.5 hours at 72°–83° C., 26 g. (theoretical 27 g.) of water collected in the receiver and the solids initially present had nearly all dissolved. The reaction mixture was filtered to remove the remaining 0.5 g. of insoluble material and the filtrate was distilled at atmospheric pressure and in vacuum to remove the solvent to leave a clear, yellow-orange oil which solidified at room temperature and became a free-flowing liquid at 120° C. The tin content of the product was from 26.7 to 27.6 percent.

EXAMPLE B

This example illustrates the preparation of a butyltin oxide and p-aminobenzoic acid reaction product. A mixture of 249 g. (1.0 mole) dibutyltin oxide and 274 g. (2.0 moles) p-aminobenzoic acid in 1,050 g. of benzene was stirred and heated in a flask attached to a Dean Stark received. After 2 hours at 70°–80° C., 17.5 g. (18 g. theoretical) of water was collected in the received and the reaction mixture was filtered to remove a small remaining quantity of solids. The filtrate was distilled at room atmospheric pressure and then under vacuum to remove benzene, leaving a yellow oil which solidified to a glassy material at room temperature and then slowly crystallized to form very large white crystals. Subjection to infrared analysis indicated no unreacted dibutyltin oxide or p-aminobenzoic acid. The reaction product was free-flowing liquid at 160° C. and the tin content was 22.9 to 23.7 percent.

EXAMPLE C

This example illustrates the preparation of an epoxy resin cross-linking material from the reaction of dibutyltin oxide and p-hydroxybenzoic acid. A mixture of 249 g. (1.0 mole) dibutyltin oxide and 276 g. (2.0 moles) p-hydroxybenzoic acid in 600 g. of benzene was stirred and heated in a flask with a Dean-Stark receiver. After 3.5 hours at 71° to 81° C., 17.5 g. (theoretical 18 g.) of water was collected. The reaction mixture was filtered to remove 1 g. of undissolved material and the clear, pale, amber filtrate was distilled at atmospheric pressure and under vacuum to remove solvent. The remaining clear yellow oil residue solidified to a glassy material at room temperature and had a tin content of 22.8 to 23.6 percent based on the tin content of the dibutyltin oxide. It turned to a liquid at a temperature of approximately 150° C.

EXAMPLE D

This example illustrates the preparation of a dibutyltin oxide Nadic Methyl Anhydride (NMA) cross-linking agent. A mixture of 500 g. (2.81 moles) Nadic Methyl Anhydride and 125 g. (0.50 mole) dibutyltin oxide was stirred and heated, the dibutyltin oxide dissolving at a temperature of about 128° C. The reaction mixture was stirred an additional 2 hours at 128°–143° C., giving a clear, pale, amber oil which solidified at room temperature to a soft, waxy solid and which liquified at approximately 100° C. The tin content of the product based on the tin content of the dibutyltin oxide used was 9.3 to 9.6 percent.

EXAMPLE E

This example illustrates the preparation of a cross-linking agent from Nadic Methyl Anhydride and dibutyltin oxide. A mixture of 375 g. (2.11 moles) Nadic Methyl Anhydride and 250 g. (1.00 mole) dibutyltin oxide was stirred and heated for about 1 hour at 75°–160° C. and then for 1.25 hours at 161°–173° C. The clear, amber oil produced solidified at room temperature to a waxy solid which became pourable at about 125° C. The tin content of the product based on the tin content of the dibutyltin oxide was 18.6 to 19.2 percent.

Any of the usual epoxy or ethoxyline resins having 1, 2 epoxy groups are useful in connection with the present invention. Included are the usual bisphenol-A diglycidyl ether epoxy resins as well as those derived from polyolefin or glycerides or oils. Among other useful epoxy resins are the so-called epoxy novolac resins and cycloaliphatic epoxy resins. Such resins are well known in the art and some are set forth, for example, in U.S. Pat. Nos. 2,324,483; 2,444,333; 2,494,295; 2,500,600; and 2,511,913. Mixtures of epoxy resins can also be used. Among the specific epoxy resins used in exemplary manner in the following examples are Epon 828 of the Shell Chemical Company which is a liquid diglycidyl ether of bisphenol-A having an epoxide equivalent weight of from 185 to 192. Epon 1001 is normally solid bisphenol-A diglycidyl ether reaction product made by Shell and having a melting point of from about 65° to 75° C. and an epoxide equivalent weight of 450–550.

Epoxy novolac resins are typified by Dow DEN 438 which has an epoxide functionality of 3.6 and an epoxide equivalent weight of 175–182. This material may be expressed by the formula

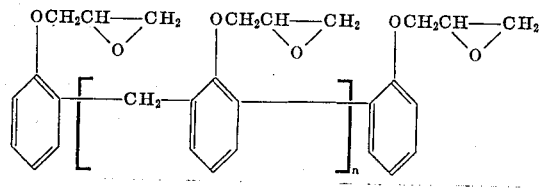

Very useful in connection with the present invention are cycloaliphatic epoxy resins having 1,2 epoxy groups which are typified by ERLA 4221 having an epoxide equivalent weight of 126 to 140, manufactured by Union Carbide Plastics Company and having the following formulation

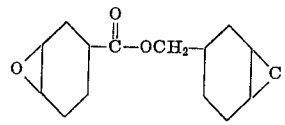

Still another useful epoxy resin is CY-175 (Ciba Products Company) having an epoxide equivalent weight of about 160 and represented by the formula

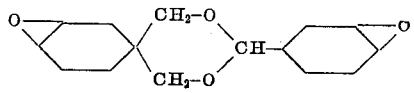

In curing the various epoxy resins with the organotin compositions, the organotin material was melted, such melting occurring generally at temperatures of from about 100°–160° C. in which condition they were readily soluble in epoxy resins heated to 80° to 150° C., the solutions remaining clear when cooled to room temperature. All samples were cured for 15 hours at 160° C. in order to attain uniform treating conditions. However, it will be realized that for many of the examples, lower cure temperatures and shorter cure times are entirely adequate.

EXAMPLE 1

Shown in table I below are various results obtained when ERLA 4221 epoxy resin was cured with a mixture of the dibutyltin oxide sebacic acid reaction product of example A along with the Nadic Methyl Anhydride (NMA) to speed the cure, all materials being in parts by weight as shown. Shown in the table is the dissipation factor cured as above at various temperatures and the heat distortion of the material at 264 p.s.i. using samples 5×½×½ inches according to ASTM D648–56. The ten mils deflection was taken as the heat distortion temperature. Also shown in the table are the tensile strengths and elongation for the above materials.

TABLE I

| | Parts by weight | Parts by weight | Parts by weight |
|---|---|---|---|
| ERLA 4221 | 30 | 30 | 30 |
| Bu₂SnO-sebacic (Example A) | 30 | 30 | 30 |
| NMA | 10 | 20 | 30 |
| Sn content, percent | 11.4–11.8 | 10.0–10.4 | 8.9–9.2 |

| | Dissipation factor (tan δ) | | |
|---|---|---|---|
| Temperature, °C.: | | | |
| 25 | 0.0010 | 0.0014 | 0.0017 |
| 75 | 0.0030 | 0.0021 | 0.0076 |
| 100 | 0.0044 | 0.0029 | 0.017 |
| 125 | 0.015 | 0.012 | 0.040 |
| 150 | 0.038 | 0.033 | 0.048 |

| | Heat distortion at 264 p.s.i., temp., °C. | | |
|---|---|---|---|
| Mils deflection: | | | |
| 1 | 75 | 90 | 76 |
| 5 | 91 | 103 | 83 |
| 10 (HDT) | 99 | 112 | 89 |
| Tensile strength at 25° C., p.s.i | 4,500 | 4,300 | |
| Elongation at break, percent | 1.9 | 1.8 | |

The effect of corona on the above type of compositions was also determined, 30-mil-thick samples being used with a needle point electrode corona test at 105° C. in air at 3,000 cycles/sec. and 2,500 volts with an airgap of 15 mils. Included in table II below showing the results of such corona tests are results obtained with other typical, commercially available materials for comparison purposes.

TABLE II

| Sample: | Average failure time, hours |
|---|---|
| Epon 1001-N-aminoethylpiperazine | 17 |
| ERLA 4221-Novolac type phenolic resin | 33 |
| Polyethylene terephthalate | 21 |
| Aromatic polyimide | 41 |
| ERLA 4221: 30 parts, Bu₂SnO-sebacic: 30 parts (Ex. A), NMA: 10 parts | 4,055 |
| ERLA 4221: 30 parts, Bu₂SnO-sebacic: 30 parts (Ex. A), NMA: 30 parts | 2,899 |
| Silicone rubber | >5,000 |

It will be noted from table II above that the corona resistance of the present materials is far and away greater than that of other typical materials with the exception of silicone rubber. However, it will be appreciated, as pointed out above, that while silicone rubber has good chemical resistance, its heat distortion and physical strength may have much to be desired where such characteristics are required.

EXAMPLE 2

Shown in table III below are the dissipation factor and heat distortion characteristics of dibutyltin oxide-sebacic acid and Nadic Methyl Anhydride cured cycloaliphatic epoxy resin materials, CY-175.

TABLE III

|  | Parts by weight | Parts by weight | Parts by weight |
|---|---|---|---|
| CY 175 | 30 | 30 | 30 |
| Bu₂SnO-sebacic (Ex. A) | 30 | 30 | 30 |
| NMA | 10 | 20 | 30 |
| Sn content, percent | 11.4-11.8 | 10.0-10.4 | 8.9-9.2 |

| Dissipation factor (tan δ) (60 cycles, 10 v.p.m.) | | | |
|---|---|---|---|
| Temperature, °C.: | | | |
| 25 | 0.00075 | (¹) | 0.0011 |
| 100 | 0.0023 | (¹) | 0.021 |
| 130 | 0.019 | (¹) | 0.036 |
| 155 | 0.054 | (¹) | 0.059 |

| Heat distortion at 264 p.s.i., temperature, °C. | | | |
|---|---|---|---|
| Mils deflection: | | | |
| 1 | 81 | 85 | 72 |
| 5 | 93 | 99 | 83 |
| 10 (HDT) | 104 | 109 | 91 |

¹ Not measured.

EXAMPLE 3

Very hard, clear, amber castings which were extremely tough and self-extinguishing were prepared by curing an epoxy resin, specifically Epon 828, with the dibutyltin oxide-sebacic acid product of example A along with catalytic amounts of 2-ethyl-4-methylimidazole (EMI). The dissipation factor and heat distortion of various compositions of such materials are shown in table IV below.

TABLE IV

|  | Parts by weight | Parts by weight | Parts by weight | Parts by weight |
|---|---|---|---|---|
| Epon 828 | 50 | 50 | 60 | 60 |
| Bu₂SnO-sebacic (Ex. A) | 50 | 50 | 40 | 40 |
| EMI | 1.5 | 2.5 | 1.5 | 2.5 |
| Sn Content, percent | 13.2-13.6 | 13.0-13.5 | 10.5-10.9 | 10.4-10.8 |

| Dissipation factor | | | | |
|---|---|---|---|---|
| Tan δ (60 cycles, 25° C.) | 0.0030 | 0.0032 | 0.0030 | 0.0032 |

| Heat distortion at 264 p.s.i. | | | | |
|---|---|---|---|---|
| Temp., °C | 65 | 56 | 75 | 71 |

EXAMPLE 4

Useful resins were also obtained by using as a curing agent the reaction product of 1.5 moles of dibutyltin oxide and 1 mole of sebacic acid reacted similarly to example A. The organotin material contained 31.2 to 32.2 percent tin. A casting prepared from 30 parts ERLA 4221 epoxy resin, 30 parts of the dibutyltin sebacic acid material and 30 parts of Nadic Methyl Anhydride had a dissipation factor at 60 cycles of 0.0014 at 25° C., 0.0047 at 100° C., 0.018 at 130° C., and 0.043 at 155° C.

EXAMPLE 5

The dibutyltin oxide-p-aminobenzoic acid reaction product of example B was melted at 160° C. and then mixed with Epon 828 or DEN 438 in the proportions indicated in table V below. The clear resin solutions remained clear when cooled to room temperature and cured as above to hard, clear, tough, amber solids having dissipation factors and heat distortion qualities as shown in table V below.

TABLE V

| Number | Parts by weight | | | |
|---|---|---|---|---|
|  | 1 | 2 | 3 | 4 |
| Epon 828 | 59.9 |  |  |  |
| DEN 438 |  | 55 | 58.6 | 62.5 |
| Bu₂SnO-p-aminobenzoic acid (Ex. B) | 40.1 | 45 | 41.4 | 37.5 |
| Sn content, percent | 9.2-9.5 | 10.3-10.7 | 9.5-9.8 | 8.6-8.9 |

| Dissipation factor tan δ (60 cycles, 10 v.p.m.) | | | | |
|---|---|---|---|---|
| Temperature, °C.: | | | | |
| 25 | (¹) | 0.0037 | (¹) | 0.0041 |
| 100 | (¹) | 0.0022 | (¹) | 0.0029 |
| 130 | (¹) | 0.0016 | (¹) | 0.0021 |
| 155 | (¹) | 0.0042 | (¹) | 0.001 |
| 175 | (¹) | 0.028 | (¹) | 0.0041 |

| Heat distortion at 264 p.s.i., temperature, °C. | | | | |
|---|---|---|---|---|
| Mils deflection: | | | | |
| 1 | 111 | 144 | 163 | 155 |
| 5 | 133 | 152 | 168 | 164 |
| 10 (HDT) | 140 | 158 | 172 | 169 |

¹ Not determined.

EXAMPLE 6

The dibutyltin-p-aminobenzoic acid reaction product of example B was combined with epoxy resins, Epon 828 and DEN 438 in the proportions shown in table VI below, the resulting materials being very hard and having the other characteristics shown in table VI below.

TABLE VI

|  | Parts by weight | Parts by weight |
|---|---|---|
| Epon 828 | 59.9 |  |
| DEN 438 |  | 58.6 |
| Bu₂SnO-p-aminobenzoic acid (Ex. B) | 40.1 | 41.4 |
| Sn content, percent | 9.2-9.5 | 9.5-9.8 |
| Tensile strength at 25° C., p.s.i. | 4,900 | 3,700 |
| Percent elongation at break | 2.4 | 1.4 |
| Flexural strength at 25° C., p.s.i. | 9,600 | 14,000 |

Shown in table VII below is a comparison of the epoxy resins of example 6 above with other typical epoxy resins and other resinous materials insofar as regards corona resistance which was measured in the same manner as for table II above.

TABLE VII

| Sample | Avg. failure time |
|---|---|
| Epon 1004, a solid bisphenol-A, diglycidyl ether reaction product having a melting point of from about 95 to 105°C and an epoxide equivalent weight of 875-1025 – Polyester polyacid. | 18 hours |
| Epon 1001 – N – aminoethylpiperazine | 17 hours |
| ERLA 4221 – novolac type phenolic resin | 33 hours |
| Polyethylene terephthalate | 21 hours |
| Aromatic polyimide | 41 hours |
| Epon 828 (59.9 parts) – Bu₂SnO-p-aminobenzoic acid (Example B) (40.1 parts). | 1164 hours |
| DEN 438 (58.6 parts) – Bu₂SnO-p-aminobenzoic acid (Example B) (41.4 parts). | 891 hours |
| Silicone rubber | More than 5,000 hours. |

EXAMPLE 7

The dibutyltin oxide-p-hydroxybenzoic acid reaction product of example C was melted by heating to 150° C. and mixed in various proportions with epoxy resins as shown in table VIII below which were also heated to 100°-150° C. The resins when cured as above produced tough, hard, clear, yellow solids. In the case of the Nadic Methyl Anhydride, it was found that dissolving 20 parts of this material and 80 parts of the material of example C lowered the melting point of the combined hardener so that it could be mixed with epoxy resins at 75°-100° C. Shown in table VIII below is the dissipation factor for various combinations of the above materials.

TABLE VIII

| | Parts by weight | Parts by weight | Parts by weight | Parts by weight |
|---|---|---|---|---|
| ERLA 4221 | 25 | | 30 | |
| Epon 828 | | 30 | | |
| DEN 438 | | | | 30 |
| Bu₂SnO-p-hydroxybenzoic acid (Example C) | 25 | 20 | | |
| Bu₂SnO-p-hydroxybenzoic acid (Example C) NMA (20%) | | | 20 | 20 |
| Sn content, percent | 11.4-11.8 | 9.2-9.4 | 7.3-7.6 | 7.3-7.6 |
| Dissipation factor tan δ (60 cycles, 10 v.p.m.) | | | | |
| Temperature, °C.: | | | | |
| 25 | 0.0032 | 0.0029 | 0.0030 | 0.0030 |
| 75 | 0.0070 | 0.0032 | 0.0037 | 0.0036 |
| 100 | 0.018 | 0.0045 | 0.0053 | 0.0041 |
| 125 | 0.083 | 0.056 | 0.0094 | 0.0099 |
| 155 | 0.12 | 0.15 | 0.045 | 0.048 |
| 175 | | 0.45 | 0.082 | 0.060 |

EXAMPLE 8

Shown in table IX below are the dissipation factors of combinations of dibutyltin oxide and Nadic Methyl Anhydride reaction product of example D with various epoxy resins as indicated. DB8 is an accelerator and is a product of the Argus Chemical Company.

TABLE IX
Dissipation factor v. temperature

| | | | | | | | | |
|---|---|---|---|---|---|---|---|---|
| ERLA 4221 | 40 | 50 | 60 | | | | | |
| CY-175 | | | | 30 | 40 | | | |
| DEN 438 | | | | | | 40 | 50 | 60 |
| NMA-Bu₂SnO (Ex. D) | 60 | 50 | 40 | 70 | 60 | 60 | 50 | 40 |
| DB8 | 1 | 1 | 1 | 1 | 1 | 1 | 1 | 1 |
| Sn content, percent | 5.5-5.7 | 4.6-4.8 | 3.7-3.8 | 6.4-6.7 | 5.5-5.7 | 5.5-5.7 | 4.6-4.8 | 3.7-3.8 |
| Dissipation factor tan δ (60 cycles, 10 v.p.m.) | | | | | | | | |
| Temperature, °C.: | | | | | | | | |
| 25 | 0.0015 | 0.0018 | 0.0020 | 0.0064 | 0.0029 | 0.0019 | 0.0018 | 0.0020 |
| 100 | 0.0040 | 0.0025 | 0.0039 | 0.010 | 0.0064 | 0.0060 | 0.0029 | 0.0032 |
| 130 | 0.0052 | 0.0036 | 0.0060 | 0.0085 | 0.0076 | 0.0018 | 0.0060 | 0.0080 |
| 155 | 0.0078 | 0.0070 | 0.013 | 0.013 | 0.0075 | 0.045 | 0.031 | 0.050 |

EXAMPLE 9

Useful, tough, clear, amber cured epoxy resins were also prepared by cross-linking the epoxy material with the dibutyltin oxide-Nadic Methyl Anhydride reaction product of example E. The dissipation factor corresponding to various combinations of these materials is shown in table X below.

TABLE X
Dissipation factor v. temperature

| | | |
|---|---|---|
| Epon 828 | 50 | 60 |
| NMA-Bu₂SnO (Example E) | 50 | 40 |
| 2-ethyl-4-methylimidazole | 1.5 | 1.5 |
| Sn content, percent | 9.2-9.5 | 7.3-7.6 |
| Dissipation factor (60 cycles, 10 v.p.m.) | | |
| Temperature, °C.: | | |
| 25 | 0.0033 | 0.0032 |
| 75 | 0.0030 | 0.0029 |
| 100 | 0.0033 | 0.0033 |

Shown in table XI below are the heat distortion characteristics of various combinations of epoxy resins and the dibutyltin oxide Nadic Methyl Anhydride material of example D.

There are provide, then, by the present invention epoxy resin hardeners and epoxy resins cured therewith, the latter of which are tough, hard, transparent, homogeneous materials which are not degraded by elevated temperatures and which are resistant to corona damage. Large, void-free castings are readily prepared from the materials since no volatiles are formed during the curing reaction. The materials, because of the presence of organotin compounds, have fungicidal properties. The epoxy resin compositions described herein can be used as adhesives, coatings, encapsulating and potting compounds, as insulators in high voltage applications, as binders for micaceous and other types of tape, as binders and prepregs and other laminated structures and in filament winding applications. The materials can be readily filled with well known fillers as desired, and can be formulated to form molding and fluid bed powers.

What we claim as new and desire to secure by Letters Patent of the United States is:

1. An epoxy resin having 1, 2 epoxy groups and from about 20 to 120 parts by weight per 100 parts of epoxy resin of a hardener which is the reaction product in a least equivalent amounts of a material selected from the group consisting of organotin oxide, organotin ester and organotin halide in which the organo group is selected from the group consisting of dialkyl, diaryl and aralkyl, and organic acidic material selected from the group consisting of dicarboxylic acids, aminofunctional carboxylic acids, carboxylic acid anhydrides thereof and mixtures thereof.

2. An epoxy resin as in claim 1 in which the hardener is present in an amount of about 80 parts by weight per 100 parts of epoxy resin.

3. An epoxy resin as in claim 1 in which the material is dibutyl tin oxide.

4. An epoxy resin as in claim 1 in which the material is dibutyltin diacetate.

5. An epoxy resin as in claim 1 in which the material is dibutyltin dichloride.

TABLE XI

| | | | | | | | | | |
|---|---|---|---|---|---|---|---|---|---|
| ERLA 4221 | 40 | 50 | 60 | | | | | | |
| CY-175 | | | | 30 | 40 | 60 | | | |
| DEN 438 | | | | | | | 40 | 50 | 60 |
| NMA-Bu₂SnO (Ex. D) | 60 | 50 | 40 | 70 | 60 | 40 | 60 | 50 | 40 |
| DB8 | 1 | 1 | 1 | 1 | 1 | 1 | 1 | 1 | 1 |
| Sn content | 5.5-5.7 | 4.6-4.8 | 3.7-3.8 | 6.4-6.7 | 5.5-5.7 | 3.7-3.8 | 5.5-5.7 | 4.6-4.8 | 3.7-3.8 |
| Temperature, °C. | | | | | | | | | |
| Mils deflection: | | | | | | | | | |
| 1 | 121 | 140 | 116 | 75 | 115 | 157 | 91 | 115 | 100 |
| 5 | 142 | 157 | 135 | 92 | 142 | 164 | 108 | 131 | 112 |
| 10 (HDT) | 149 | 161 | 143 | 103 | 150 | 168 | 114 | 137 | 119 |